PACKAGED ELECTRONIC DEVICE
Filed Feb. 13, 1964
3 Sheets-Sheet 1
Fig. 1
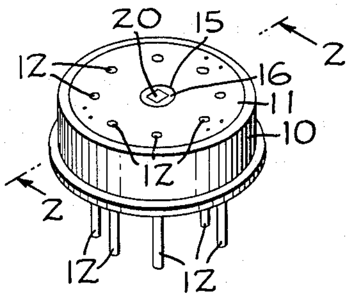
Fig. 2
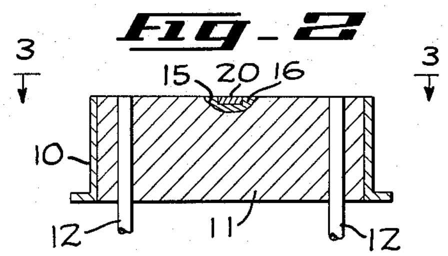
Fig. 3
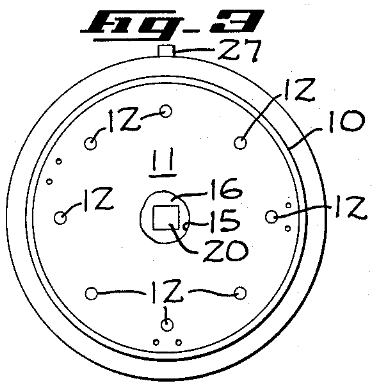
Fig. 4
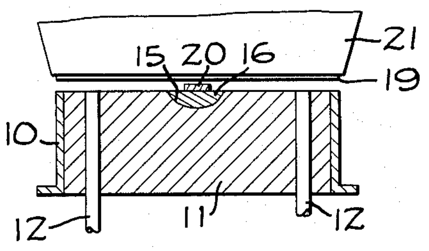
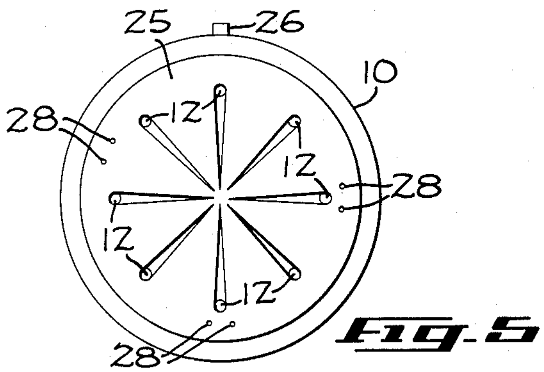
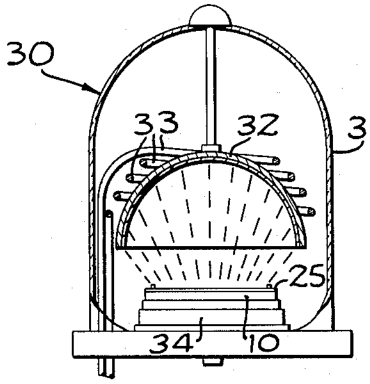
Fig. 6
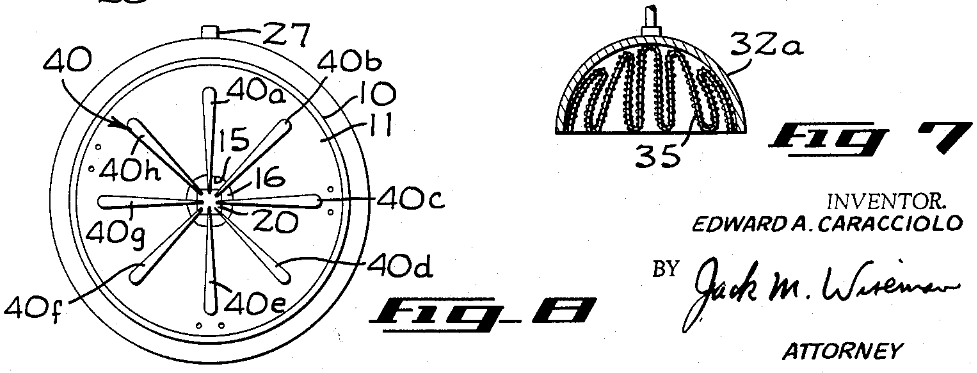
Fig. 7, Fig. 8
INVENTOR.
EDWARD A. CARACCIOLO
BY Jack M. Wiseman
ATTORNEY July 19, 1966 E. A. CARACCIOLO 3,262,022

PACKAGED ELECTRONIC DEVICE

Filed Feb. 13, 1964 3 Sheets-Sheet 2

INVENTOR.
EDWARD A. CARACCIOLO

BY Jack M. Wiseman

ATTORNEY

PACKAGED ELECTRONIC DEVICE

Filed Feb. 13, 1964

INVENTOR.
EDWARD A. CARACCIOLO
BY Jack M. Wiseman
ATTORNEY

3,262,022
PACKAGED ELECTRONIC DEVICE

Edward A. Caracciolo, Santa Clara, Calif., assignor to General Micro-Electronics Inc., a corporation of Delaware Filed Feb. 13, 1964, Ser. No. 344,741
11 Claims. (Cl. 317—101)

The present invention relates to a method of and product for packaging semiconductive and microelectronic devices.

It is common practice to package a semiconductive device in a header having a plurality of leads sealed within a glass seal. Wire is generally bonded to each terminal of the semiconductive device by a metallic ball. The other end of each wire is bonded to a lead of the header. Thus, in establishing an electrical connection between a terminal of the semiconductive device and a lead of the header, two bonding operations are generally employed.

An object of the present invention is to provide an improved method for the packaging of semiconductive and microelectronic devices.

Another object of the present invention is to provide an improved product for the packaging of semiconductive and microelectronic devices.

Another object of the present invention is to provide a more economical method for packaging semiconductive and microelectronic devices without sacrificing reliability or usability.

Another object of the present invention is to provide a method for the packaging of semiconductive and microelectronic devices that minimizes the likelihood of mechanical damage to the packaged device and that also lessens the tendency of mechanical failure within the packaged device.

Another object of the present invention is to provide a method for the packaging of semiconductive devices in which one or more mechanical bonding operations, such as welding or soldering, for the establishment of electrical connections between the terminals of the semiconductive device and the leads of the package is obviated.

Another object of the present invention is to provide a packaged semiconductive device in which connections from the terminals of the semiconductive device to the leads of the package is made without resorting to welding, soldering or other mechanical bonding.

Another object of the present invention is to provide a method for packaging a plurality of semiconductive devices.

Another object of the present invention is to provide a method for packaging one or more semiconductive devices wherein the interconnections between the package leads and the terminals of the semiconductive devices are produced simultaneously.

Other and further objects and advantages of the present invention will be apparent to one skilled in the art from the following description taken in conjunction with the accompanying drawings, in which:

FIG. 1 is a perspective view of a semiconductive device embedded within a low temperature melting glass, which in turn is fused to a high temperature melting glass seal that is contained within a header.

FIG. 2 is a vertical sectional view taken along line 2—2 of FIG. 1.

FIG. 3 is a plan view taken along line 3—3 of FIG. 2.

FIG. 4 is a diagrammatic sketch of a platen above the assembly shown in FIG. 3 before the semiconductive device is embedded within the low temperature melting glass.

FIG. 5 is a plan view of the assembly shown in FIG.

3 with a thin metal foil mask thereon having an interconnecting conduct lead pattern formed therein.

FIG. 6 is a schematic diagram of a vacuum evaporator for depositing metal to form the interconnecting conductor lead array.

FIG. 7 is a schematic diagram of an alternate arrangement for depositing metal to form the interconnecting conductor lead array.

FIG. 8 is a plan view of the assembly shown in FIG. 4 with the metal mask removed and with the formed interconnecting conductor lead array.

Figure 9:
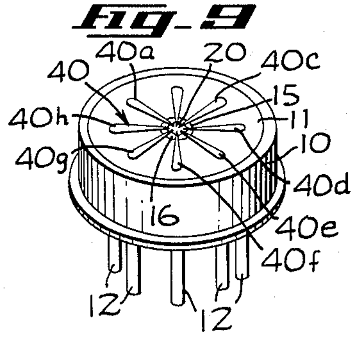

FIG. 9 is a perspective view of the semiconductive device embedded within sealing glass contained by the header and having the terminal leads thereof connected to the header leads by the interconnecting conductor lead array.

Figure 10:
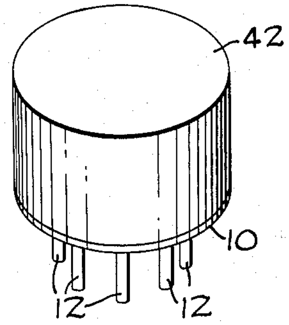

FIG. 10 is a perspective view of the assembly shown in FIG. 8 with a hermetically sealed cap thereon.

Figure 11:
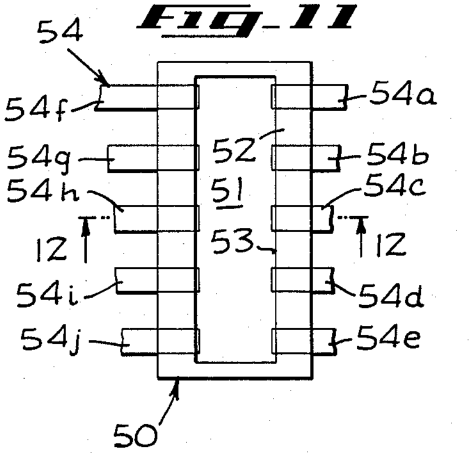

FIG. 11 is a plan view of metal conducting leads sandwiched between insulating bodies with the upper insulating body having a cavity formed therein.

Figure 12:
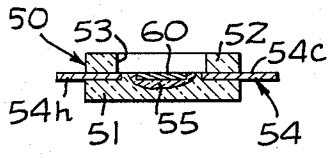

FIG. 12 is a vertical sectional view taken along line 12—12 of FIG. 11 with a semiconductive device seated on the floor of the cavity.

Figure 13:
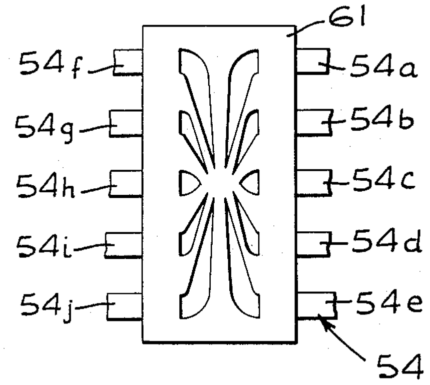

FIG. 13 is a plan view of the assembly shown in FIGS. 11 and 12 with a thin metal foil mask having an interconnecting conductor lead array pattern formed therein.

Figure 14:
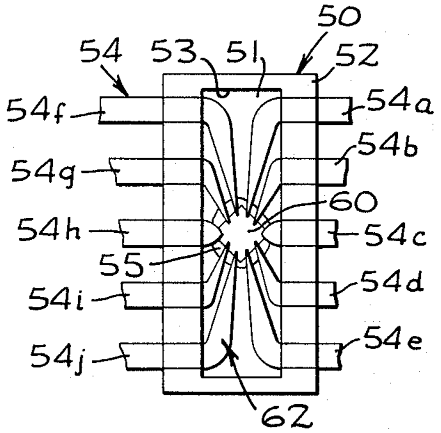

FIG. 14 is a plan view of the assembly shown in FIG. 13 with the metal mask removed and the formed interconnecting conductor lead array.

Figure 15:
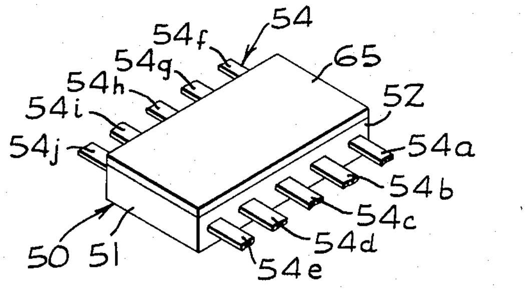

FIG. 15 is a perspective view of the semiconductive device embedded within the cavity of the sealing glass and with the terminal leads thereof connected to the package leads by the interconnecting conductor lead array.

Figures 16, 17, 17A, 18, 18A, 19, 20:
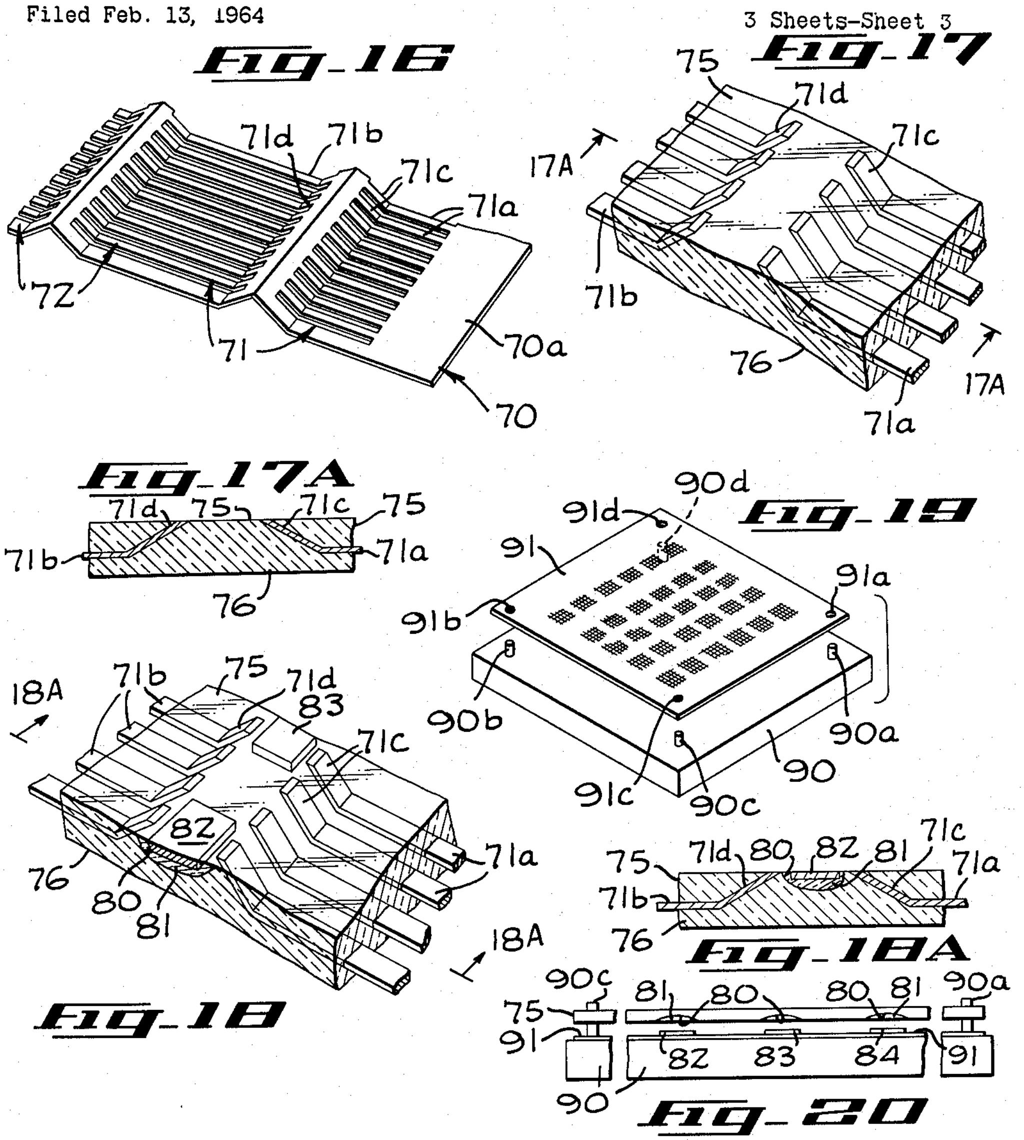

FIG. 16 is a perspective view of the preformed interconnecting conductor metal strip for a plurality of semiconductive devices.

FIG. 17 is a perspective view of the metal strip of FIG. 16 embedded within an insulating glass strip.

FIG. 17A is an enlarged vertical sectional view taken along line 17A—17A of FIG. 17.

FIG. 18 is a perspective view of the assembly prepared for evaporating the interconnecting conductor lead array.

FIG. 18A is a vertical sectional view taken along line 18A—18A of FIG. 18.

FIG. 19 is an exploded view of a die-embedment assembly.

FIG. 20 is a cross-sectional view of the die-embedment assembly of FIG. 19 in conjunction with the assembly of FIG. 18.

Figure 21:
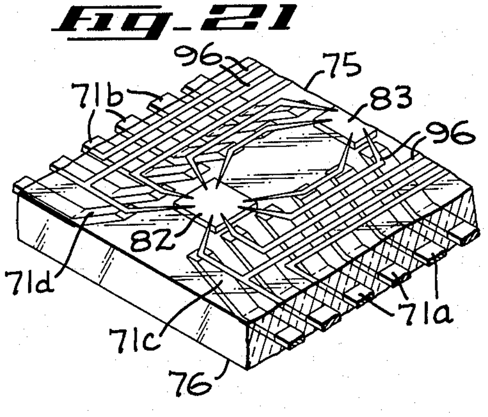

FIG. 21 is a perspective of the assembly with the interconnecting conductor lead array.

Figure 22:
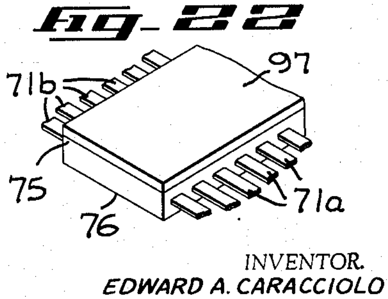

FIG. 22 is a perspective view of the semiconductive devices packaged.

Illustrated in FIGS. 1 and 2 is a suitable header or housing 10, which has a generally cylindrical configuration. The header or housing 10 is made from suitable material, such as gold-plated Kovar. Contained within the housing 10 is a relatively high temperature melting glass 11, such as hard borosilicate, which forms a matched glass-to-metal seal or insulating body with the cylindrical housing 11. Fixedly secured or embedded within the high temperature melting sealing glass 11 is a plurality of leads 12, such as eight, which extend to even height with the upper surface of the glass 11 and the housing 10, and which project below the lower surface of the sealing glass 11 and cylindrical housing 10. The leads 12 are made from suitable material, such as gold-plated Kovar.

Formed in the high temperature melting glass 11 is a crater or cavity 15, which is axially disposed relative to the axis of the cylindrical housing 10. The cavity 15 may be formed in any well-known manner, such as by photo-resist masking, or by the application of a suitably perforated etch-resistant tape, such as Mylar, which may be applied to the upper surface of the sealing glass 11. The pattern of the masking tape applied to the upper surface of the sealing glass 11 is such as to permit the formation of the cavity 15 in the glass 11. After the masking tape is applied, the assembly is immersed in a suitable glass etchant solution, such as 49% solution of hydrofluoric acid, for a suitable period of time, such as ten minutes.

After the cavity 15 is formed in the high temperature melting glass 11, a bed of relatively low temperature melting glass 16 is disposed within the cavity 15. The low temperature melting glass powder 16 is made of suitable material, such as commonly employed low melting lead glass. In low temperature package applications, thermosetting plastics may be used in lieu of the glass embedment material 16.

At this time, heat is applied to the low temperature melting glass powder 16, whereby the low temperature melting glass 16 fuses into the high temperature melting glass 11 forming a homogeneous glass mass. A semiconductive device 20, which is produced independently of the forming of the package units in a well-known and conventional manner, is placed onto the molten glass bed 16. Thereupon, a sheet of suitable release material, such as a mica sheet 19 (FIG. 4), is attached to the lowermost surface of a suitable thermally controlled platen 21 (FIG. 4) above the upper surface of the semiconductive device 20, the upper surface of the bed 16 and the upper surface of the glass body 11.

Now, the platen 21 is lowered to cause heat-pressure contact between the mica sheet 19 and the just-mentioned upper surfaces. As a consequence thereof, the semiconductive device 20 is pressed into the molten glass bed 16 until the upper surface of the semiconductor device 20 is planar with the upper surface of the leads 12, the upper surface of the high temperature melting glass 11, and the upper surface of the low temperature melting glass bed 16. (See FIG. 2.) After the foregoing is completed, the mica sheet 19 when cooled is removed or peeled away from the assembly.

Thereupon, a thin metal foil mask 25 (FIG. 5), such as a magnetic steel mask, is placed on the upper planar surfaces of the glass 11, glass 16, semiconductive device 20 and leads 12. The metal foil mask 25 has preformed therein openings conforming to the configuration of an interconnecting conductor lead array. For indexing the metal foil mask 25, a tab 26 (FIG. 5) thereon is disposed in overlying relation with a tongue 27 (FIG. 3) on the housing 10 so that the edges thereof are coincident. In addition, template projection 28 in the metal foil mask 25 are received by corresponding recesses in the glass 11. As a consequence thereof, the radial openings of the metal foil mask 25 are arranged to extend from the package leads 12 to the terminals of the semiconductive device 20.

Subsequently, the assembly shown in FIG. 5 is placed in a suitable vacuum evaporator 30 (FIG. 6), which comprises a vacuum chamber 31, a clad metal dome 32, a R.F. heating coil 33, magnetic template base 34, and a conductor metal, such as aluminum, which is clad over molybdenum or other suitable susceptor material. By employing the domed evaporating fixture 32, which is of a parabolic configuration, the metal is deposited on the upper layer of the assembly disposed within the vacuum evaporator 30 in a thin, smooth, even layer. As a result thereof, there is deposited a coherent layer of metal over any microscopic step, ridge or other defect in the surface, since the metal vapor will strike any point on the target surface by virtue of the omni-directional particle trajectory.

Alternately, a high resistance wound dome 32*a* (FIG. 7) may be employed in lieu of the clad metal dome 32 and the R.F. heating coils. Attached to high resistance wire 35 of the dome 32*a* is the metal to be deposited, such as aluminum.

After the even layer of metal is deposited through the thin metal foil mask 25, the assembly is removed from the vacuum evaporator 30 and the metal foil mask 25 is removed or lifted from the assembly. As a consequence thereof, an interconnecting conductor lead array 40 (FIGS. 8 and 9) of suitable conducting metal is formed, which includes radial conductor leads 40*a*–40*h*. The radial conductor leads 40*a*–40*h* adhere to the upper ends of the header leads 12, respectively, (FIGS. 8 and 9) adhere to the terminals of the semiconductive device 20. Thus, electrical connections are established from the terminals of the semiconductive device 20 to the leads 12 of the housing 10 without any mechanical bonding, such as welding or soldering.

It may be desired to coat the entire planar surface of the assembly with conducting material and remove by photo-resist or photo-etching techniques the portions of the coated surface not serving as the interconnecting conductor lead array.

Optionally, a thin dielectric film, such as magnesium fluoride, may be deposited to the surface of the previously described assembly by conventional means, such as vacuum evaportion. A cap 42 (FIG. 10) may be secured to the housing 10.

As shown in FIGS. 9 and 10, the packaged semiconductive device of the present invention comprises the cylindrical housing 10. Contained within the cylindrical housing 10 is the high temperature melting glass 11. The housing leads 12 are secured within the housing 10 by the glass 11 and have the lower extremities thereof project below the housing 10. At the upper extremities thereof, the leads 12 are at even height with the upper surface of the sealing glass 11.

Formed in the sealing glass 11 coincident with the cylindrical axis of the housing 10 is the cavity 15, which is filled with the bed of the low temperature melting glass 16 and the embedded semiconductive device 20. The upper surface of the housing 10, the upper surface of the leads 12, the upper surface of the glass 11, the upper surface of the glass 16, the upper surface of the semiconductive device 20 are planar and at even height.

Embedded within the upper surface of the glass 11 and the glass 16 is the conductor lead array 40 which is disposed in sealed engagement therewith for adhering contact with the upper ends of the leads 12 and the terminals of the semiconductive device 20. The interconnecting conductor lead array 40 overlies in contact relation the upper ends of the leads 12 and the terminals of the semiconductive device 20 for establishing electrical interconnections between the terminals of the semiconductive device 20 and the header leads 12.

Illustrated in FIGS. 11 and 12 is a unitary structure 50 comprising an insualting base 51 of suitable high temperature melting glass, such as hard borosilicate. In the preferred embodiment, the base 51 has a rectangular configuration with a flat, planar upper surface. Disposed above the base 51 is an upper insulating member 52 of suitable high temperature melting glass, such as hard borosilicate. The upper insulating member 52 has a rectangular configuration and has a rectangular crater or cavity 53 formed therein with a planar bottom wall.

Embedded and sealed between the dielectric base 51 and the dielectric member 52 are parallel package conductor leads 54*a*–54*j*, which form a package conductor lead array 54 and are made of suitable metal conducting material, such as Kovar. The conductor leads 54*a*–54*e* are parallel and project outwardly from the unitary structure 50 and inwardly into the cavity 53. Likewise, the conductor leads 54*f*–54*j* are parallel and project outwardly from the unitary structure 50 and inwardly into the cavity 53 so as to be in spaced transverse alignment with the package conductor leads *54a–54e*. The cavity 53 in the dielectric member 52 provides access to the confronting ends of the package conductor leads *54a–54j*.

In forming the sealed unitary structure 50 of FIG. 11, a strip of conducting material, such as Kovar or other metal, is preformed with a plurality of laterally extending parallel conductor leads. The strip of conducting material is embedded between an upper and lower insulating or dielectric strip of high temperature melting material, such as hard borosilicate with the insulating strip centrally located intermediate the sides of the metal conducting strip. The assembly is fired in a furnace for a suitable time, such as seven minutes, and at a suitable temperature of 1650° F. Thereupon, the assembly is removed from the furnace and annealed in a suitable manner, such as for a period of fifteen minutes at 950° F. Upon cooling, the unitary structure 50 as formed comprises a strip of conductor material sandwiched or embedded between the strips of insulating glass material.

The cavity 53 or crater is formed in the upper insulating strip 52 by photomasking or by masking the upper insulating strip 52 with an etch-resistant material, such as suitably perforated Mylar. The mask is formed so that the rectangular cavity 53 with a planar bottom wall is created in the upper insulating strip 52 to expose the conductor leads of the metal conductor strip 54. Thereupon, a solution of hydrofluoric acid is applied to the upper insulating strip 52 which selectively removes the glass, but does not attack the metal conductor strip 54.

After the cavity 53 is formed in the high temperature melting glass 52, a bed of relatively low temperature melting glass 55 is disposed within the cavity 53. The low temperature melting glass powder 55 is made of suitable material, such as commonly employed low melting lead glass. In low temperature package applications, thermosetting plastics may be used in lieu of the glass embedment material 55.

At this time, heat is applied to the low temperature melting glass powder 55, whereby the low temperature melting glass 55 fuses into the high temperature melting glass 51 forming a homogeneous glass mass. A semiconductive device 60, which is produced independently of the forming of the package units in a well-known and conventional manner, is placed onto the molten glass bed 55. Thereupon, a sheet of suitable release material, such as the mica sheet 19 of FIG. 4, is attached to the lowermost surface of a suitable thermally controlled platen, such as the platen 21 of FIG. 4. The mica sheet will fit between the upstanding flanges of the insulating body 52 and is positioned above the upper surface of the semiconductive device 60, the upper surface of the bed 55 and the upper surface of the glass body 51.

Now, the platen is lowered to cause heat-pressure contact between the mica sheet and the referred-to upper surfaces. As a consequence thereof, the semiconductive device 60 is pressed into the molten glass bed 55 and the upper surface of the semiconductive device 60 is planar with the package leads 54, the upper surface of the insulating body 51, and the upper surface of the low temperature melting glass bed 55. (See FIG. 12.). After the foregoing is completed and after the mica sheet has cooled, the mica sheet is removed or peeled away from the assembly.

At this time, a thin metal foil mask 61 (FIG. 13), such as a magnetic steel mask, is placed on the upper planar surfaces of the ends of the package conductor leads *54a–54j*, the glass 55, the insulating body 51 and the semiconductive device 60 between the upstanding flanges of the dielectric member 52. The metal foil mask 61 has preformed therein openings conforming to the configurations of an interconnecting conductor lead array.

Subsequently, the assembly shown in FIG. 13 is placed in a suitable vacuum evaporator, such as vacuum evaporator 30 of FIG. 6. As a result thereof, there is deposited a coherent layer of metal, such as aluminum, on the exposed surfaces through the metal foil mask 61.

After the even layer of metal is deposited on the exposed surfaces through the thin metal foil mask 61, the assembly is removed from the vacuum evaporator and the metal foil mask 61 is removed or lifted from the assembly. As a consequence thereof, an interconnecting conductor lead array 62 (FIG. 14) of suitable conducting metal is formed. The conductor leads of the interconnecting conductor lead array 62 adhere to the upper surfaces of the package conductor leads in the cavity 53 and adhere to the terminals of the semiconductive device 60. Thus, electrical connections are established from the terminals of the semiconductive device 60 to the package conductor leads *54a–54j* without any mechanical bonding, such as welding or soldering.

After the foregoing is completed, the assembly of FIG. 14 is hermetically sealed. For this purpose, a metal cap 65 (FIG. 15) of suitable material, such as Kovar, is employed, which is glazed on the lower surface thereof with a low temperature melting glass or a solder glass. The cap 65 is aligned to fit over the cavity 53 in an inert atmosphere. A thermally controlled platen, not shown, is lowered onto the glazed metal cap 65 melting the glass surface thereof to seal the package, thereby hermetically sealing the semiconductive device 60 within the package.

As shown in FIGS. 14 and 15, the packaged semiconductive device of the present invention comprises a lower, flat, rectangularly-shaped insulating member 52. The upper insulating member 52 forms a rectangular crater 53 with a flanged periphery or rim. Disposed in sealed, embedded relation between the insulating base 51 and the insulating member 52 is the package conductor lead array 54 with parallel series of conductor leads projecting out of the package.

Sealted on the upper surface of the insulating base 51 is a fused bed of the low temperature melting glass 55 and embedded within the glass 55 is the semiconductive device 60. Interconnecting in fixed relation the terminals of the semiconductive device 60 and the package conductor leads *54a–54j* is the interconnecting conductor lead array 62. The interconnecting conductor lead array 62 adheres to and is disposed above the semiconductive 60 and the package conductor leads *54a–54j* for establishing electrical connections therebetween. The cap 65 is disposed in bonded relation in the cavity 53 to hermetically seal the package.

Illustrated in FIG. 16 is a preformed metal strip 70 made of suitable material, such as Kovar or Therlo. The preformed metal strip comprises a base **70*a*. Formed in the base 70*a* are juxtaposed groups of package conductor leads 71 and 72. The groups of package conductor leads 71 and 72 extend longitudinally. Each group of package conductor leads includes a series of transversely disposed, parallel package conductor leads. For example, group 71 includes series 71*a* and 71*b*. At the confronting ends thereof for each group, the package conductor leads are crimped or bent upwardly, such as at 71*c* and 71*d* for group 71**, and the remaining portions thereof are horizontal.

The metal strip 70 is cleaned for disposition between an upper insulating or dielectric strip 75 and a lower insulating or dielectric strip 76 (FIG. 17). It is to be observed that the width of the insulating strips 75 and 76 is less than the width of a group of package conductor leads, such as group 71. In addition, the insulating strips 75 and 76 are centrally located relative to the free edges of each group of package conductor leads, whereby the free ends of the package conductor leads project outwardly from the sides of the dielectric strips 75 and 76. In the preferred embodiment, the dielectric strips 75 and 76 are made from hard borosilicate, which is a relatively high temperature melting glass.

The metal strip 70 is disposed between the insulating strips 75 and 76 and is retained in a firing jig assembly, not shown, for advancement through a furnace, for example, twenty minutes at a furnace temperature, for example 925° C. As a consequence thereof, the metal strip 70 is sandwiched and embedded between the insulating srtips 75 and 76 to form a sealed, unitary structure. The sealed, unitary structure of the conducting strip 70 sandwiched between the insulating strips 75 and 76 is removed from the furnace and advanced through an annealing and cooling chamber until cooled to room temperature.

Upon completion of the formation of the sealed, unitary structure, the upper surface thereof is lapped to form a flat, planar surface with the junction of the crimped ends of the package lead conductors removed (FIGS. 17 and 17A). As a consequence thereof, each side of the unitary structure now has a separate set of parallel, transversely disposed package conductor leads.

After the foregoing has been carried out, photo-resist material or an etch- resist perforated masking tape is applied to the lapped surface of the sealed, unitary structure. In the preferred embodiment, the masking tape is made of solvent resistant material, such as tape #853 produced by Minnesota Mining and Mineral Corporation or Mylar. The pattern of the masking tape applied to the lapped surface is such as to permit the formation of a channel or recess 80 (FIG. 18A) in the lapped surface of the sealed, unitary structure.

After the acid-resist masking tape is applied to the lapped surface of the sealed, unitary structure, a suitable glass etchant solution is applied to the masked and exposed surface, whereby the channel 80 is formed in the lapped surface along the entire longitudinal dimension thereof. The depth of the channel 80 is sufficient to permit a recess below the confronting crimped ends of the package conductor leads (FIG. 18A). In the preferred embodiment, the etchant solution is a 49% solution of hydrofluoric acid and the etch application time is ten minutes.

The channel 80 is now filled with a relatively low temperature melting glass powder 81, such as low melting lead glass or in lieu thereof suitable thermosetting plastics. At this time, heat is applied to the low temperature melting glass powder 81, whereby the low temperature melting glass powder 81 fuses into the high temperature melting glass 75 forming a homogeneous bed or layer. To be disposed within the low temperature molten glass bed 81 in longitudinally spaced relation are a plurality of semiconductive devices 82, 83 and 84.

In lieu of a thermally controlled platen, a heater block 90 (FIGS. 19 and 20) is employed. At each corner of the block 90 are alignment or indexing posts **90*a*–90*d*. Seated on the heater block 90 is a die registering sheet 91, which in the preferred embodiment is a transparent mica sheet. Formed on a surface of the mica sheet 91 are evaporated metal interconnecting conductor lead array patterns conforming in location and configuration to the desired interconnecting conductor leads. This may be accomplished through the vacuum evaporator previously described. The mica sheet 91 includes apertures 91*a*–91*d* to receive the posts 90*a*–90*d* of the heater block 90 for alignment and indexing. A volatilizable adhesive, such as bi-phenyl, is applied to the mica sheet 91 to retain the same in its precisely aligned position on the heater block 90**.

The mica sheet 91 is placed on the heater block 90 so that the interconnecting conductor lead array pattern is facing away from the heater block 90. Thereupon, the assembly shown in FIG. 18 is placed on the mica sheet 91 with the semi-conductive devices 82–84 precisely located with respect to the conductor lead array pattern of the mica sheet 91 and with the glass bed 81 engaging the mica sheet 91. A suitable weight, not shown, is applied to the assembly for heat-pressure contact to embed the semiconductive devices 82–84 into the heat softened bed of the glass 81. As a consequence thereof, the semiconductive devices 82–84 are embedded in the glass channel bed 81 with the upper surfaces thereof planar with the upper surface of the bed 81, the crimped ends **71*c* and 71*d* of the package lead conductors 71*a* and 71*b*, respectively, and the upper surface of the dielectric strip 75. (See FIGS. 18 and 18A.) After the just described assembly is removed from the heater block 90 and cooled, the mica sheet 91** is peeled away leaving a planar, mirror-smooth, heterogeneous surface as the upper surface of the assembly with the impression of the conductor lead array patterns.

Thereupon, a thin metal foil mask, not shown, but similar to mask 25, and made of suitable material, such as magnetic steel, is placed on the upper planar surface of the assembly. The metal foil mask, which is similar to mask 25, has preformed therein openings conforming to the configuration of an interconnecting conductor lead array and registerable with the conductor lead array patterns impression remaining after the mica sheet 91 is removed.

Subsequently, the assembly shown in FIG. 18 with the metal foil mask thereon is placed in a suitable vacuum evaporator, such as vacuum evaporator 30 of FIG. 6. As a result thereof, there is deposited a coherent layer of metal, such as aluminum, on the exposed surfaces through the foil mask.

After the even layer of metal is deposited on the exposed surfaces through the thin metal foil mask, the assembly is removed from the vacuum evaporator and the metal foil mask is removed or lifted from the assembly. As a consequence thereof, an interconnecting conductor lead array 96 (FIG. 21) of suitable conducting metal, such as aluminum is formed. The conductor leads of the interconnecting conductor lead array 96 adhere to the upper surfaces of the package conductor leads **71*a* and 71*b* and adhere to the terminals of the semiconductive devices 82–84. Thus, electrical connections are established from the terminals of the semi-conductive device 82 to the package conductor leads 71*a* and 71*b*, and, also to select terminals on the semiconductive 83** without any mechanical bonding, such as welding or soldering.

After the foregoing is completed, the assembly of FIG. 21 is hermetically sealed. For this purpose, a metal cap 97 (FIG. 22) of suitable material, such as Kovar, is employed, which is glazed on the lower surface thereof with a low temperature melting glass or a solder glass. The cap 97 is aligned to fit over the assembly of FIG. 21 in an inert atmosphere. A thermally controlled platen, not shown, is lowered onto the glazed metal cap 97 melting the glass surface thereof to seal the package, thereby hermetically sealing the semiconductive devices 82–84 within the package.

As shown in FIGS. 21 and 22, the packaged semiconductive devices 82–84 of the present invention comprises a lower flat rectangularly shaped insulating base 75 and an upper insulating member 76. Disposed in sealed, embedded relation between the insulating base 75 and the insulating member 76 are the package lead conductors **71*a* and 71*b* with crimped confronting ends 71*c* and 71*d*, respectively. The package conductor leads 71*a* and 71*b*** project laterally out of the package.

Seated on the upper surface of the insulating base 75 is a fused bed of the low temperature melting glass 81 and embedded within the glass 81 are the semiconductive devices 82–84. Interconnecting successive semiconductive devices and also interconnecting terminals of the semiconductive devices and the package conductor leads is the interconnecting conductor lead array 96. The cap 97 is disposed in bonded relation with the insulating member 76.

While reference is made to insulating glass, it is apparent that plastics, other organic structural material, and certain epoxies may be employed where suitable in the application thereof. Although reference is made to different melting temperatures for the insulating material, it is within the contemplation of the present invention that different setting characteristics may be employed. The use of different plastics may provide the different setting characteristics.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A packaged electronic device comprising a glass body of insulating material formed with a cavity therein, a plurality of leads imbedded within said body with portions thereof projecting out of said body, a bed of glass insulating material meltable at a temperature lower than the melting temperature of said body, said bed being disposed within said cavity and being fused into said body to form a homogeneous glass mass, a surface of said bed being planar with the surface of said body surrounding said cavity, an electronic device embedded in said bed, and an interconnecting conductor lead array adhering to said leads and said electronic device for establishing electrical connections therebetween.

2. A packaged electronic device comprising a glass body of insulating material formed with a cavity therein, a plurality of leads imbedded within said body with portions thereof projecting out of said body, a bed of plastic insulating material meltable at a lower temperature than the melting temperature of said body, said bed being disposed within said cavity and being fused into said body, an electronic device embedded in said bed, said electronic device having a surface thereof planar with a surface of said bed and the surface of said body surrounding said cavity, and an interconnecting conductor lead array adhering to said leads and said electronic device for establishing electrical connections therebetween.

3. A packaged electronic device comprising a metallic housing, a glass body of insulating material disposed within said housing, said body being formed with a cavity in the upper surface thereof, a plurality of package leads fixed within said body and extending in the general direction of said housing and projecting in the vicinity of said cavity, a bed of insulating material meltable at a temperature lower than the melting temperature of said body, said bed being disposed within said cavity in fixed relation with said body, an electronic device embedded in said bed, and a plurality of interconnecting conductors adhering to said package leads and said electronic device for establishing electrical connections therebetween.

4. A packaged electronic device comprising a metallic housing, a body of glass insulating material disposed within said housing, said body being formed with a cavity in the upper surface thereof, a plurality of package leads fixed within said body, said package leads extending in the general direction of said housing with the upper end projecting at substantially even height with the upper surface of said body and with the lower ends thereof projecting out of said body, a bed of glass insulating material meltable at a temperature lower than the melting temperature of said body, said bed being disposed in said cavity and being fused into said body to form a homogeneous glass mass, the upper surface of said bed being at even height with the surface of said body surrounding said cavity, an electronic device embedded in said bed, said electronic device having the upper surface thereof planar with the upper surface of said bed, and an interconnecting conductor lead array adhering to said upper ends of said package leads and said electronic device for establishing electrical connections therebetween.

5. A packaged electronic device comprising a metallic cylindrical housing, a body of glass insulating material disposed within said housing, said body being formed with a cavity in the upper surface thereof aligned with the axis of said cylindrical housing, a plurality of package leads fixed within said body, said package leads extending in a direction parallel to the axis of said cylindrical housing with the upper end projecting substantially at even height with the upper surface of said body and with the lower ends thereof projecting out of said body, a bed of plastic insulating material meltable at a temperature lower than the melting temperature of said body, said bed being disposed in said cavity and being fused into said body, the upper surface of said bed being at even height with the surface of said body surrounding said cavity, an electronic device embedded in said bed, and an interconnecting conductor lead array having radially disposed interconnecting conductor leads adhering to the upper ends of said package leads and said electronic device for establishing electrical connections therebetween.

6. A packaged electronic device comprising a cylindrical metallic housing, a body of insulating material disposed within said housing, said body being formed with a cavity in the upper surface thereof aligned with the axis of said cylindrical housing, a plurality of package leads fixed within said body, said package leads extending in a direction parallel to the axis of said cylindrical housing with the upper end projecting substantially at even height with the upper surface of said body and with the lower ends thereof projecting out of said body, a bed of insulating material meltable at a temperature lower than the melting temperature of said body, said bed being disposed in said cavity in fixed relation with said body, the upper surface of said bed being at even height with the surface of said body surrounding said cavity, an electronic device embedded in said bed, said electronic device having the upper surface thereof planar with the upper surface of said bed, and an interconnecting conductor lead array having radially disposed interconnecting conductor leads adhering to the upper ends of said package leads and said electronic device for establishing electrical connections therebetween.

7. A packaged electronic device comprising a body of insulating material formed with a recess therein having a wall, a plurality of package leads imbedded within said body with portions thereof projecting out of said body, said package leads having the opposite ends thereof projecting into said recess with surfaces thereof on said wall and with opposing surfaces of said opposite ends exposed, a bed of insulating material meltable at a temperature lower than the melting temperature of said body, said bed being disposed on said wall in fixed relation therewith, an electronic device embedded in said bed, and a plurality of interconnecting conductor leads adhering to said exposed surfaces of said package leads and said electronic device for establishing electrical connections therebetween, said interconnecting conductor leads and said package leads being disposed in the same plane.

8. A packaged electronic device comprising a body of glass insulating material formed with a recess therein having a planar bottom wall, a plurality of package leads imbedded within said body with portions thereof projecting out of said body, said package leads having the opposite ends thereof projecting into said recess with the lower surfaces thereof seated on said planar bottom wall and with the upper surfaces of said opposite ends exposed, a bed of glass insulating material meltable at a temperature lower than the melting temperature of said body, said bed being disposed on said planar bottom wall and fused into said glass body to form a homogeneous glass mass, said bed having the upper surfaces thereof planar with the exposed surfaces of said package leads, an electronic device seated on said bed in fixed relation therewith, the upper surface of said electronic device being planar with the upper surface of said bed, and a plurality of interconnecting conductor leads adhering to said exposed surfaces of said package leads and said electronic device for establishing electrical connections therebetween, said interconnecting conductor leads and said package leads being disposed in the same plane.

9. A packaged electronic device comprising a body of glass insulating material formed with a recess therein having a planar bottom wall, a plurality of package leads imbedded within said body with portions thereof projecting out of said body, said package leads having the opposite ends thereof projecting into said recess with the lower surfaces thereof seated in said planar bottom wall at even height therewith and with the upper surfaces of said opposite ends exposed, a bed of plastic insulating material meltable at a temperature lower than the melting temperature of said body, said bed being disposed on said planar bottom wall fused into said body, said bed having the upper surfaces thereof planar with the exposed surfaces of said package leads and the upper surface of said bottom wall, an electronic device seated on said bed in fixed relation therewith, the upper surface of said electronic device being planar with the upper surface of said bed and the upper exposed surfaces of said package leads, and a plurality of interconnecting conductor leads adhering to said exposed surfaces of said package leads and said electronic device for establishing electrical connections therebetween, said interconnecting conductor leads and said package leads being disposed in the same plane.

10. A packaged electronic device comprising a body of insulating material formed with a recess therein, a plurality of leads imbedded within said body with ends thereof projecting out of said body and with opposite ends thereof projecting inwardly toward said recess, a bed of insulating material meltable at a temperature lower than the melting temperature of said body, said bed being disposed within said recess in fixed relation with said body, the upper surface of said bed being planar with the upper surface of said body, said opposite ends of said leads being upwardly directed so that the inwardly directed end surfaces thereof are planar with the upper surface of said bed and said upper surface of said body, a plurality of electronic devices embedded in said bed with the upper surfaces thereof planar with the upper surface of said bed, a plurality of interconnecting conductor leads adhering to said leads and said electronic devices for establishing electrical connections therebetween, and a plurality of interconnecting conductor leads adhering to said electronic devices for establishing electrical connections therebetween.

11. A packaged electronic device comprising a body of insulating material formed with a recess therein, a plurality of leads embedded within said body with ends thereof projecting out of said body and with opposite ends thereof projecting inwardly toward said recess, a bed of insulating material meltable at a temperature lower than the melting temperature of said body, said bed being disposed within said recess in fixed relation with said body, the upper surface of said bed being planar with the upper surface of said body, said opposite ends of said leads being upwardly directed so that the inwardly directed end surfaces thereof are planar with the upper surfaces of said bed and said upper surface of said body, an electronic device embedded in said bed with the upper surface thereof planar with the upper surface of said bed, and a plurality of interconnecting conductor leads adhering to said leads and said electronic device for establishing electrical connections therebetween.

References Cited by the Examiner

UNITED STATES PATENTS

| | | | |
|---|---|---|---|
| 3,046,452 | 7/1962 | Gellert | 317—101 |
| 3,142,783 | 7/1964 | Warren | 317—101 |
| 3,178,804 | 4/1965 | Ullery | 29—155.5 |
| 3,191,268 | 6/1965 | Matea | 29—155.5 |
| 3,192,307 | 6/1965 | Lazar | 317—101 |

ROBERT K. SCHAEFER, *Primary Examiner.*

KATHLEEN H. CLAFFY, *Examiner.*

M. GINSBURG, *Assistant Examiner.*